(12) United States Patent
Ryu et al.

(10) Patent No.: US 12,246,859 B2
(45) Date of Patent: Mar. 11, 2025

(54) APPARATUS AND METHOD FOR CONTROLLING AERIAL VEHICLE

(71) Applicants: Hyundai Motor Company, Seoul (KR); Kia Corporation, Seoul (KR)

(72) Inventors: Hyun Jee Ryu, Gyeonggi-do (KR); Kyu Nam Kim, Gyeonggi-do (KR); Chang Hyun Sung, Gyeonggi-do (KR); Jun Young Lim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 17/984,991

(22) Filed: Nov. 10, 2022

(65) Prior Publication Data

US 2023/0315127 A1 Oct. 5, 2023

(30) Foreign Application Priority Data

Mar. 29, 2022 (KR) .................. 10-2022-0039182

(51) Int. Cl.
| | |
|---|---|
| *B64U 10/13* | (2023.01) |
| *G05D 1/00* | (2006.01) |
| *G06T 7/73* | (2017.01) |
| *G06V 10/70* | (2022.01) |
| *G06V 20/17* | (2022.01) |
| *B64U 101/30* | (2023.01) |

(52) U.S. Cl.
CPC .............. *B64U 10/13* (2023.01); *G05D 1/106* (2019.05); *G06T 7/73* (2017.01); *G06V 10/70* (2022.01); *G06V 20/17* (2022.01); *B64U 2101/30* (2023.01); *G06T 2207/10032* (2013.01)

(58) Field of Classification Search
CPC ........ G05D 1/106; B64C 39/024; G06T 7/73; G06T 2207/10032; G06V 10/70; G06V 20/17; B64U 2101/30
USPC ......................................................... 701/10
See application file for complete search history.

(56) References Cited

U.S. PATENT DOCUMENTS

| | | | |
|---|---|---|---|
| 8,996,207 B2 | 3/2015 | Goossen et al. | |
| 10,029,804 B1* | 7/2018 | Chamberlain | ............ G06T 7/60 |
| 10,392,128 B2 | 8/2019 | Peng et al. | |
| 11,126,201 B2 | 9/2021 | Rozenberg et al. | |
| 2010/0142748 A1* | 6/2010 | Oldroyd | ............... G06V 10/235 |
| | | | 715/863 |
| 2018/0101817 A1* | 4/2018 | Lection | ............... G05D 1/0088 |
| 2019/0248487 A1 | 8/2019 | Holtz et al. | |
| 2020/0034646 A1* | 1/2020 | Ding | ....................... G01C 21/20 |
| 2021/0241635 A1* | 8/2021 | Tribou | ................. G08G 5/0013 |

(Continued)

FOREIGN PATENT DOCUMENTS

| | | |
|---|---|---|
| KR | 10-2020-0032964 A | 3/2020 |
| KR | 10-2307584 B1 | 9/2021 |

*Primary Examiner* — Isaac G Smith
(74) *Attorney, Agent, or Firm* — Fox Rothschild LLP

(57) ABSTRACT

Disclosed are an apparatus and method for controlling an aerial vehicle. The apparatus includes a camera that obtains an terrain image during flight, a sensor that obtains scan information of a landing point of the aerial vehicle, and a controller that estimates a location of the landing point based on the terrain image if it is determined that the landing point is recognized in the terrain image, determines whether an obstacle exists at the landing point based on the scan information, and determines whether landing of the aerial vehicle is possible based on a determination result.

16 Claims, 4 Drawing Sheets

(56) References Cited

U.S. PATENT DOCUMENTS

2022/0289376 A1* 9/2022 Hayakawa ............. B64U 70/90
2023/0013444 A1* 1/2023 Ortman ................ G05D 1/0676

* cited by examiner

APPARATUS AND METHOD FOR CONTROLLING AERIAL VEHICLE

CROSS-REFERENCE TO RELATED APPLICATION

This application claims under 35 U.S.C. § 119(a) the benefit of and priority to Korean Patent Application No. 10-2022-0039182, filed in the Korean Intellectual Property Office on Mar. 29, 2022, the entire contents of which are incorporated herein by reference.

BACKGROUND

Technical Field

The present disclosure relates to an apparatus and method for controlling an aerial vehicle.

Background

An aerial vehicle may include vehicles that have occupants including one or more pilots or one or more passengers on board and are capable of autonomous or semi-autonomous flight(driving), and vehicles that do not have occupants including one or more passengers on board and are capable of autonomous flight(driving) by an external control or program. Accordingly, the aerial vehicle may visit and investigate an area where it is difficult for a human to fly directly and perform a mission, or may be used in various fields such as meteorological observation, planetary exploration, and aerial photography.

In general, the take-off and landing of an aerial vehicle are controlled using a built-in GPS receiver so that in an area where GPS signals cannot be received, the aerial vehicle has a limit in performing vertical landing, so there is a need to provide a technology for enabling an aerial vehicle to land even when GPS signals are not received.

SUMMARY

The present disclosure has been made to address the above-mentioned problems occurring in the related art while advantages achieved by the related art are maintained intact.

An aspect of the present disclosure provides an apparatus and method for controlling an aerial vehicle that can easily perform landing of an aerial vehicle in an area where GPS signals cannot be received.

The technical problems to be addressed by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling an aerial vehicle includes a camera that obtains a terrain image during flight of the aerial vehicle, a sensor that obtains scan information of a landing point for potential use by the aerial vehicle, and a controller that estimates a location of the landing point based on the terrain image if the landing point is recognized in the terrain image, determines whether an obstacle exists at the landing point based on the scan information, and determines whether landing of the aerial vehicle is possible based on a determination result.

The controller may generate a landing point recognition model by applying a deep learning technique to a landing point data set, and recognize the landing point in the terrain image based on the landing point recognition model.

The controller may calculate three-dimensional coordinates of the landing point by using a camera inverse projection scheme based on the terrain image, and estimate a three-dimensional location of the landing point based on the three-dimensional coordinates.

The controller may fuse the location of the landing point with the scan information, and determine whether the obstacle exists at the landing point based on fused information.

The controller may determine that the landing of the aerial vehicle is impossible if it is determined that the obstacle exists at the landing point, maintain a hovering state for a specified time if landing of the aerial vehicle is impossible, and direct the sensor re-scan the landing point.

The controller may direct the camera to re-obtain the terrain image if the specified time is elapsed.

The controller may determine that the landing of the aerial vehicle is possible if it is determined that the obstacle is not detected at the landing point, and calculate a landing control value based on the three-dimensional location of the landing point.

The controller may calculate the landing control value on the basis of a target landing speed of the aerial vehicle.

The controller may control the landing of the aerial vehicle by using the landing control value, and determine whether landing is completed at the landing point.

The controller may direct the sensor to re-scan the landing point of the aerial vehicle if it is determined that the landing of the aerial vehicle is not completed.

According to another aspect of the present disclosure, a method of controlling an aerial vehicle includes obtaining a terrain image during flight of an aerial vehicle, estimating a location of the landing point based on the terrain image if the landing point is recognized in the terrain image, obtaining scan information of the landing point, determining whether an obstacle exists at the landing point based on the scan information, and determining whether landing of the aerial vehicle is possible by analyzing the scan information to determine whether the obstacle exists at the landing point.

The method may further include generating a landing point recognition model by applying a deep learning technique a landing point data set, and recognizing the landing point in the terrain image based on the landing point recognition model.

The estimating of the location of the landing point step may further include calculating three-dimensional coordinates of the landing point by using a camera inverse projection scheme based on the terrain image, and estimating a three-dimensional location of the landing point based on the three-dimensional coordinates.

The determining of whether the obstacle exists at the landing point step may further include fusing the location of the landing point with the scan information, and determining whether the obstacle exists at the landing point based on fused information.

The method may further include determining that the landing of the aerial vehicle is impossible if it is determined that the obstacle exists at the landing point, maintaining a hovering state for a specified time if landing of the aerial vehicle is impossible, and re-scanning the landing point.

The method may further include re-obtaining the terrain image if the specified time is elapsed.

The method may further include determining that the landing of the aerial vehicle is possible if the obstacle is not detected at the landing point, and calculating a landing control value based on the three-dimensional location of the landing point.

The method may further include calculating the landing control value on the basis of a target landing speed of the aerial vehicle.

The method may further include controlling the landing of the aerial vehicle by using the landing control value and determining whether landing is completed at the landing point.

The method may further include re-scanning the landing point of the aerial vehicle if it is determined that the landing of the aerial vehicle is not completed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
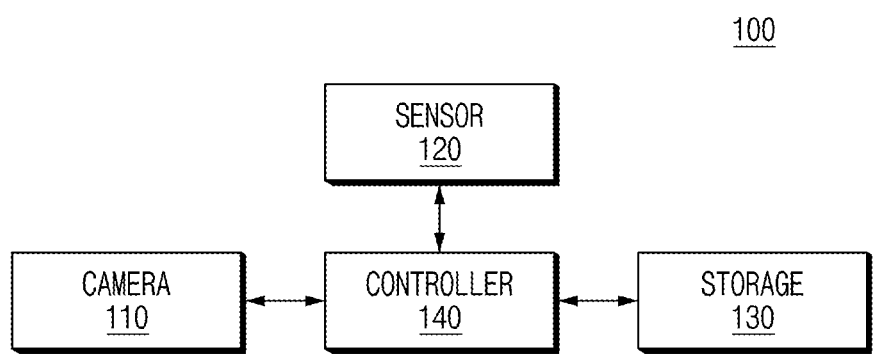
FIG. 1 is a block diagram illustrating the configuration of an aerial vehicle control apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an aerial vehicle control apparatus according to an embodiment of the present disclosure.

As shown in FIG. 1, an apparatus 100 for controlling an aerial vehicle may include a camera 110, a sensor 120, storage 130, and a controller 140.

The camera 110 may obtain a terrain image while the aerial vehicle is flying. The terrain image may include an image of a landing point. According to an embodiment, at least one camera 110 may be mounted on a lower portion of the aerial vehicle, and may be provided integrally with a body of the aerial vehicle, or may be moved or rotated independently from the body of the aerial vehicle by an actuator in vertical, left, right, front and rear directions.

The sensor 120 may obtain scan information of a landing point of the aerial vehicle. In this case, the scan information may include a scan image. According to an embodiment, the sensor 120 may include a lidar, and may detect an obstacle existing at a landing point.

The storage 130 may store at least one algorithm for performing operations or executions of various commands for the operation of an apparatus for controlling an aerial vehicle according to an embodiment of the present disclosure. The storage 130 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 140 may be implemented with various processing devices such as a microprocessor and the like in which a semiconductor chip capable of performing operations or executions of various commands is built-in, and may control operations of an apparatus for controlling a vehicle according to an embodiment of the present disclosure.

The controller 140 may determine whether the landing point is recognized in the terrain image obtained through the camera 110. According to an embodiment, the controller 140 may generate a landing point recognition model by applying a deep learning technique. In various embodiments, the deep learning technique may be based on at least one landing point data set collected in advance, and the controller may determine whether the landing point is recognized in the terrain image based on the landing point recognition model. In this case, the landing point data set may include at least one piece of data on the landing point included in the previously obtained terrain image. It shall be understood that in some embodiments, the deep learning technique may be performed by an external apparatus, network, and/or system, and data generated by the deep learning technique may be transmit to the apparatus for controlling the aerial vehicle. For example, an external system may generate the landing point recognition model, update the landing point recognition model, and transmit the landing point recognition model to the aerial vehicle for application and/or further updates by the aerial vehicle.

In various embodiments, the controller 140 may input the terrain image obtained through the camera 110 to the landing point recognition model, and if it is determined that the landing point is recognized in the terrain image, may output the landing point in the form of a box. In addition, the controller 140 may determine the type of the landing point and assign a class ID to the recognized landing point.

The controller 140 may estimate the three-dimensional location of the landing point by using a camera inverse projection scheme based on the terrain image including the landing point. According to an embodiment, the controller 140 may calculate the three-dimensional coordinates of the landing point by using the camera inverse projection scheme based on a pinhole camera model, and estimate the three-dimensional location of the landing point based on the three-dimensional coordinates. In this case, the inverse projection scheme may refer to a scheme of converting two-dimensional image plane coordinates projected in two dimensions into three-dimensional coordinates. For example, the controller 140 may calculate the three-dimensional coordinates by using Equation 1.

$$X = Z/fx*(u-cx)$$
$$Y = Z/fy*(v-cy)$$
$$Z = D \qquad \text{<Equation 1>}$$

In this embodiment, the 'D' is the altitude of the aerial vehicle, (fx, fy) are the focal length coordinates of the camera, (cx, cy) are the center coordinates of the camera, and (u, v) are the two-dimensional plane coordinates.

The controller 140 may fuse the location of the landing point with the scan information of the landing point obtained through the sensor 120, and determine whether an obstacle exists at the landing point based on the fused information.

According to an embodiment, the controller 140 may use a random sample consensus (RANSAC) to extract one point (three-dimensional coordinates) of a scan image of a sensor corresponding to one point (two-dimensional coordinates) of a landing point in an image obtained through a camera. For example, the controller 140 may extract at least eight points.

According to an embodiment, the controller 140 may calculate a transformation matrix (calibration matrix) including rotation transformation and parallel translation, and may match two-dimensional coordinates of one point of the landing point in the image obtained through the camera with the three-dimensional coordinates of one point of the scan image by using the calculated transformation matrix. Accordingly, the controller 140 may determine the location of the landing point in the scan image obtained through the sensor, and may determine whether there are obstacles around the landing point based on the scan information.

If it is determined that an obstacle exists at the landing point, the controller 140 may determine that the landing of the aerial vehicle is impossible, and may maintain the hovering state for a specified time. In this case, the hovering state may refer to a state in which the aerial vehicle is stationary over land in the air. In various embodiments, a determination that the landing of the aerial vehicle is impossible, may refer to a determination by the controller that a safe landing is not reasonably possible due to the presence of an obstacle. That is to say, a safety factor may be considered in making a determination concerning the possibility of a landing and such a determination does not necessarily require an absolute determination regarding whether a landing is truly possible or impossible.

According to an embodiment, the controller 140 may re-scan the landing point while maintaining the hovering state for a specified time. That is, if the hovering state is maintained and a specified time has not elapsed, the controller 140 may re-scan the landing point to determine again whether an obstacle exists.

If it is determined that the hovering state is maintained and a specified time has elapsed, the controller 140 may determine that landing is impossible due to the presence of an obstacle at the re-scanned landing point in the hovering state, and may obtain again the terrain image through the camera 110 to search for another landing point.

If it is determined that there is no obstacle at the landing point, the controller 140 may determine that landing at the landing point is possible.

If it is determined that landing at the landing point is possible, the controller 140 may calculate a landing control value based on the three-dimensional location of the landing point. According to an embodiment, the controller 140 may calculate the landing control value including a landing speed. For example, the controller may calculate the landing control value by taking into account a target landing speed of the aerial vehicle. In some embodiments, the target landing speed may be adjusted and/or decreased to accommodate the presence of an obstacle and/or environmental conditions.

The controller 140 may transmit the landing control value to a flight control computer that controls the flight. In this case, the flight control computer may control the operation of a driving device (motor or transmission) for flight, and according to an embodiment, may control the landing operation based on the landing control value.

The controller 140 may determine whether the landing of the aerial vehicle is completed according to the landing control of the flight control computer based on the landing control value. If it is determined that the landing of the aerial vehicle is complete, the controller 140 may terminate the operation. Meanwhile, if it is determined that the landing of the aerial vehicle is not completed, the controller 140 may re-scan the landing point until the landing is complete, determine whether an obstacle exists at the landing point, and continuously determine whether landing is possible.

Figure 2:
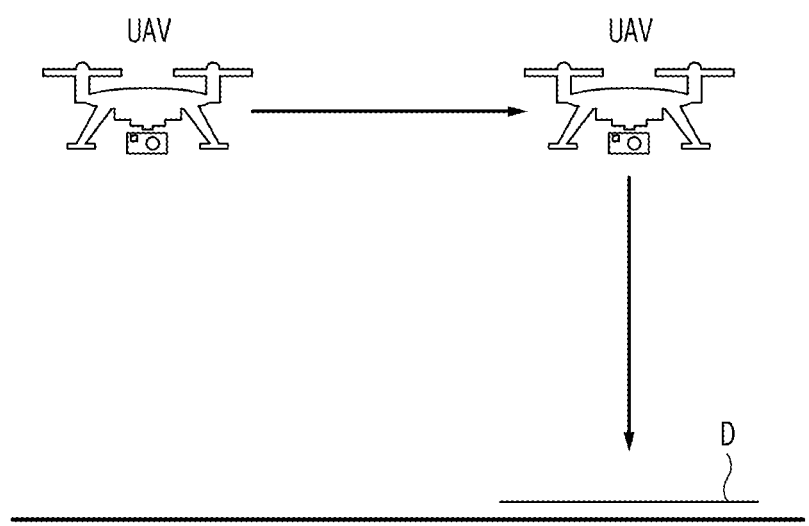
FIG. 2 is a diagram schematically illustrating the operation of an aerial vehicle according to an embodiment of the present disclosure.

FIG. 2 is a diagram schematically illustrating the operation of an aerial vehicle according to an embodiment of the present disclosure.

As shown in FIG. 2, an aerial vehicle(10) may obtain a terrain image while flying. If it is determined that a landing point "D" is included in a terrain image based on a learning result (landing point is recognized), the UAV may estimate the three-dimensional location of the landing point "D" and scan the landing point to determine whether an obstacle exists. The aerial vehicle may include an unmanned motor vehicle that an occupant is not on board.

The aerial vehicle(10) may calculate a landing control value based on the three-dimensional location of the landing point "D" if there is no obstacle at the landing point "D", and may determine whether the landing is completed at the landing point if the landing is controlled by the landing control value.

Figure 3:
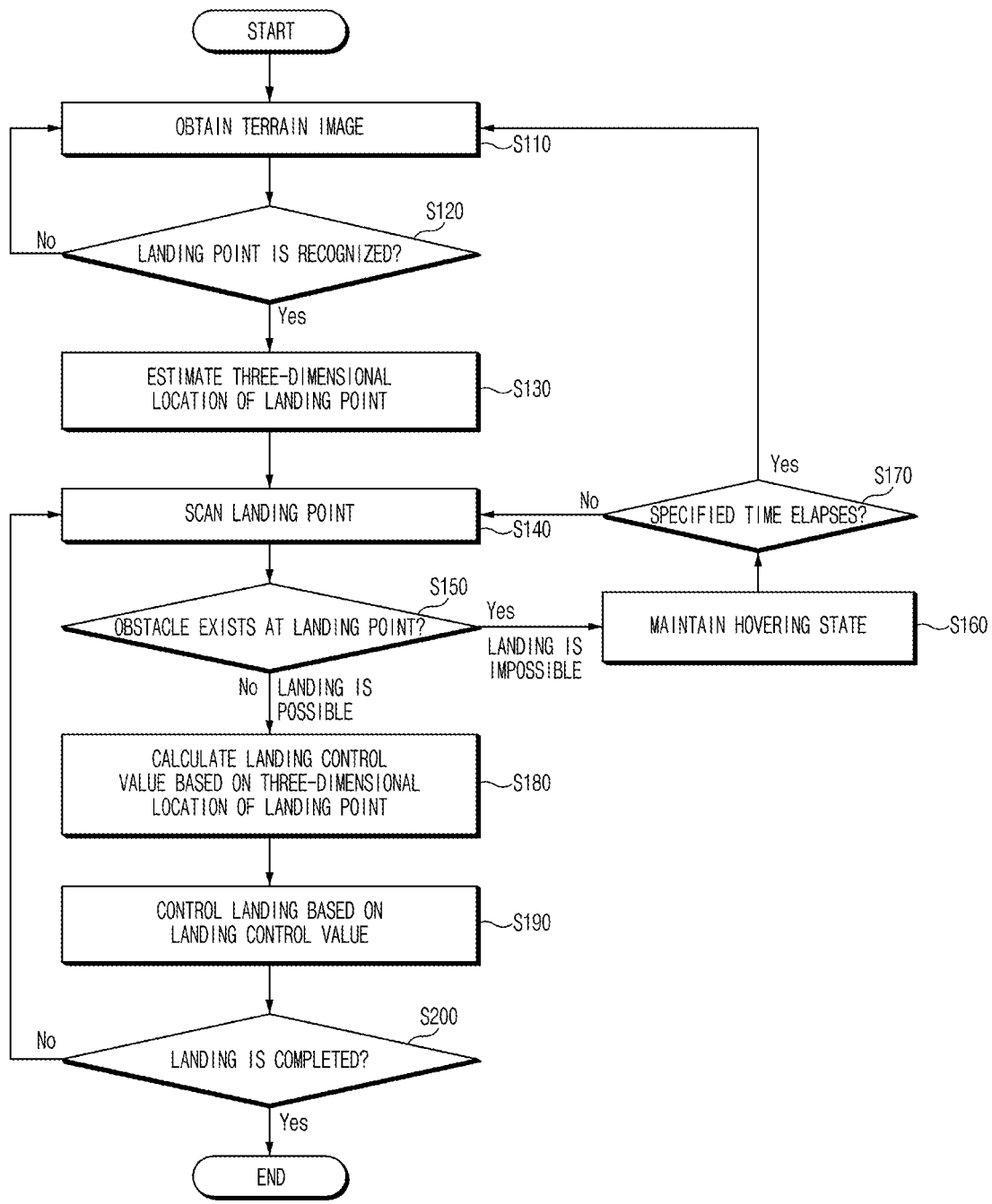
FIG. 3 is a flowchart illustrating a method of controlling an aerial vehicle according to an embodiment of the present disclosure.

FIG. 3 is a flowchart illustrating a method of controlling an aerial vehicle according to an embodiment of the present disclosure.

In S110, the controller 140 may obtain a terrain image through the camera 110.

In S120, the controller 140 may determine whether the landing point is recognized in the terrain image obtained through the camera 110. According to an embodiment, in S120, the controller 140 may generate a landing point recognition model by deep learning based on at least one landing point data set previously collected, and determine whether a landing point is recognized in the terrain image based on the landing point recognition model. In this case, the landing point data set may include at least one piece of data on the landing point included in the previously obtained terrain image.

For example, the controller 140 may input the terrain image obtained through the camera 110 to the landing point recognition model, and may output the landing point in the form of a box if it is determined that the landing point is recognized in the terrain image. In addition, the controller 140 may determine the type of the landing point and assign a class ID to the recognized landing point.

If it is determined in S120 that the landing point is recognized in the terrain image obtained through the camera 110 (Yes), the controller 140 may output the landing point in the form of a box. In addition, the controller 140 may determine the type of the landing point and assign the class ID to the recognized landing point.

In S130, the controller 140 may estimate the three-dimensional location of the landing point by using a camera inverse projection scheme based on the terrain image including the landing point. According to an embodiment, in S130, the controller 140 may calculate the three-dimensional coordinates of the landing point by using the camera inverse projection scheme, and may estimate the three-dimensional location of the landing point based on the three-dimensional coordinates.

In S140, the controller 140 may obtain scan information of the landing point by using the sensor 120.

In S150, the controller 140 may determine whether an obstacle exists at the landing point. In S150, the controller 140 may fuse the three-dimensional location of the landing point with the scan information of the landing point obtained through the sensor 120, and determine whether an obstacle exists at the landing point based on the fused information.

If it is determined in S150 that there is an obstacle at the landing point (Yes), in S160, the controller 140 may determine that the landing of the aerial vehicle is impossible, and may maintain the hovering state for a specified time. In this case, the hovering state may refer to a state in which the aerial vehicle is stationary over land in the air.

In S170, the controller 140 may determine whether a specified time has elapsed while maintaining the hovering state.

If it is determined in S170 that the specified time has not elapsed (No) while maintaining the hovering state, in S140, the controller 140 may re-scan the landing point. That is, if the hovering state is maintained and a specified time has not elapsed, the controller 140 may re-scan the landing point to determine again whether an obstacle exists.

If it is determined in S170 that the specified time has elapsed (Yes), in S110, the controller 140 may determine that landing is impossible due to the presence of an obstacle at the re-scanned landing point in the hovering state, and obtain again the terrain image through the camera 110 to search for another landing point.

If it is determined in S150 that there is no obstacle at the landing point (No), the controller 140 may determine that it is possible to land at the landing point.

If it is determined in S150 that the landing at the landing point is possible, in S180, the controller 140 may calculate the landing control value based on the three-dimensional location of the landing point. According to an embodiment, the controller 140 may calculate the landing control value including a landing speed.

The controller 140 may transmit the landing control value to the flight control computer that controls the flight. In this case, in S190, the flight control computer may control the operation of the driving device (motor or transmission) for flight, and according to an embodiment, may control the landing operation based on the landing control value.

In S200, the controller 140 may determine whether the landing of the aerial vehicle is completed according to the landing control of the flight control computer based on the landing control value. If it is determined in S200 that the landing of the aerial vehicle is completed (Yes), the controller 140 may terminate the operation.

Meanwhile, if it is determined in S200 that the landing of the aerial vehicle is not completed (No), the controller 140 may re-scan the landing point until the landing is completed. Accordingly, the controller 140 may determine whether an obstacle exists at the landing point and continuously determine whether landing is possible.

Figure 4:
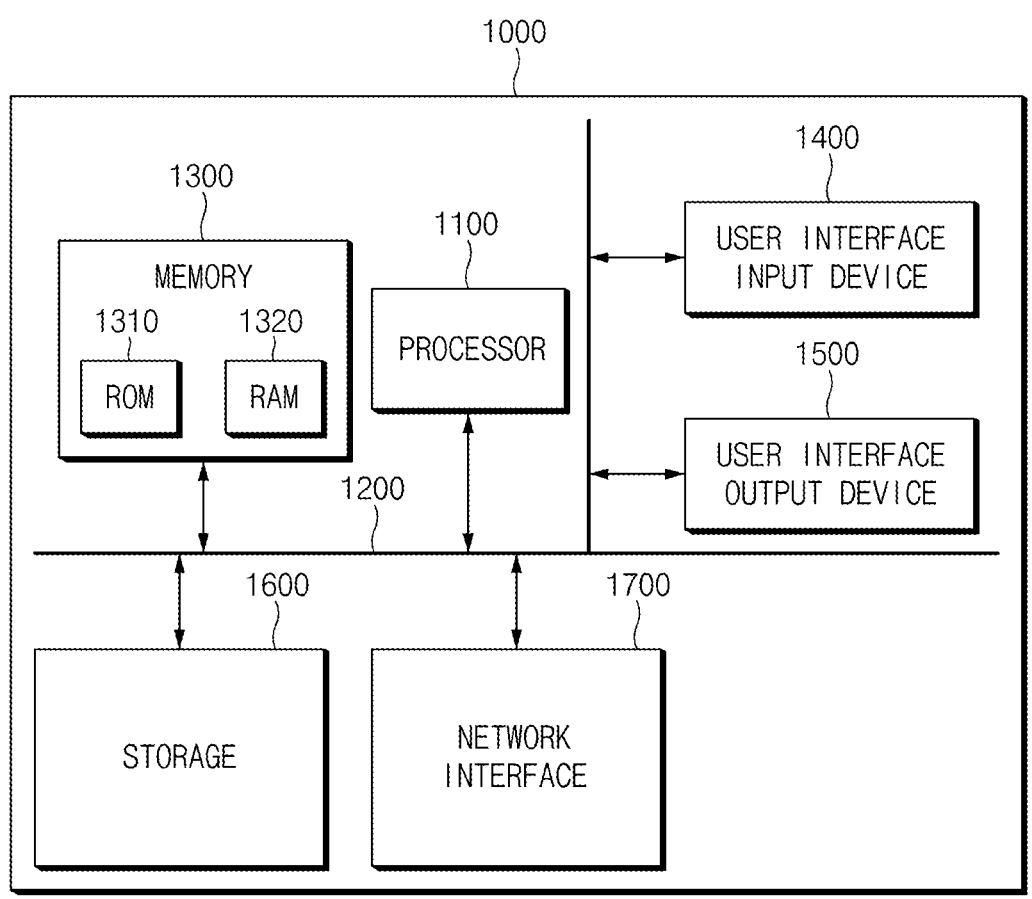
FIG. 4 is a block diagram illustrating a computing system for executing a method according to an embodiment of the present disclosure.

FIG. 4 is a block diagram illustrating a computing system for executing a method according to an embodiment of the present disclosure.

Referring to FIG. 4, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for controlling an aerial vehicle according to the embodiments of the present disclosure may secure the safety of the aerial vehicle by easily performing take-off and landing of the aerial vehicle in an area where GPS signals cannot be received.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling an aerial vehicle, the apparatus comprising:
   a camera configured to obtain a terrain image during flight of an aerial vehicle;
   a sensor configured to obtain scan information including a scan image of a landing point for potential use by the aerial vehicle; and
   a controller configured to:

estimate a location of the landing point based on the terrain image if the landing point is recognized in the terrain image;

extract one point in the scan image obtained from the sensor corresponding to one point of the landing point in the terrain image obtained from the camera;

match the one point of the landing point with the one point in the scan image;

determine the location of the landing point in the scan image based on the one point in the scan image;

determine whether an obstacle exists at the landing point based on the scan image; and determine whether landing of the aerial vehicle is possible based on a determination result that does not indicate existence of the obstacle, and if landing is determined to be possible, control landing of the aerial vehicle.

2. The apparatus of claim 1, wherein the controller is further configured to:

calculate three-dimensional coordinates of the landing point by using a camera inverse projection scheme based on the terrain image, and estimate a three-dimensional location of the landing point based on the three-dimensional coordinates.

3. The apparatus of claim 1, wherein the controller is further configured to:

determine that the landing of the aerial vehicle is impossible if it is determined that the obstacle exists at the landing point, maintain a hovering state for a specified time if landing of the aerial vehicle is impossible, and direct the sensor to re-scan the landing point.

4. The apparatus of claim 3, wherein the controller is further configured to:

direct the camera to obtain a new terrain image if the specified time is elapsed.

5. The apparatus of claim 2, wherein the controller is further configured to:

determine that the landing of the aerial vehicle is possible if the obstacle is not detected at the landing point, and calculate a landing control value based on the three-dimensional location of the landing point.

6. The apparatus of claim 5, wherein the controller is further configured to calculate the landing control value on the basis of a target landing speed of the aerial vehicle.

7. The apparatus of claim 5, wherein the controller is further configured to:

control the landing of the aerial vehicle by using the landing control value, and determine whether landing is completed at the landing point.

8. The apparatus of claim 1, wherein the controller is further configured to direct the sensor to re-scan the landing point of the aerial vehicle after obtaining the scan information if it is determined that the landing of the aerial vehicle is not completed.

9. A method of controlling an aerial vehicle, the method comprising:

obtaining, by a camera, a terrain image during flight of an aerial vehicle;

estimating, by a controller, a location of the landing point based on the terrain image if the landing point is recognized in the terrain image;

obtaining, by a sensor, scan information including a scan image of the landing point;

extracting, by the controller, one point in the scan image obtained from the sensor corresponding to one point of the landing point in the terrain image obtained from the camera;

matching, by the controller, the one point of the landing point with the one point in the scan image;

determining, by the controller, the location of the landing point in the scan image based on the one point in the scan image;

determining, by the controller, whether an obstacle exists at the landing point based on the scan image; and determining, by the controller, whether landing of the aerial vehicle is possible by analyzing the scan information to determine whether the obstacle exists at the landing point, and if landing is determined to be possible, controlling landing of the aerial vehicle.

10. The method of claim 9, wherein the estimating of the location of the landing point step further includes:

calculating three-dimensional coordinates of the landing point by using a camera inverse projection scheme based on the terrain image, and estimating a three-dimensional location of the landing point based on the three-dimensional coordinates.

11. The method of claim 9, further comprising:

determining that the landing of the aerial vehicle is impossible if it is determined that the obstacle exists at the landing point, maintaining a hovering state for a specified time if landing of the aerial vehicle is impossible, and re-scanning the landing point.

12. The method of claim 11, further comprising:

obtaining a new terrain image if the specified time is elapsed.

13. The method of claim 10, further comprising:

determining that the landing of the aerial vehicle is possible if the obstacle is not detected at the landing point, and calculating a landing control value based on the three-dimensional location of the landing point.

14. The method of claim 13, further comprising:

calculating the landing control value on the basis of a target landing speed of the aerial vehicle.

15. The method of claim 13, further comprising:

controlling the landing of the aerial vehicle by using the landing control value, and determining whether landing is completed at the landing point.

16. The method of claim 9, further comprising:

re-scanning the landing point of the aerial vehicle after obtaining the scan information if it is determined that the landing of the aerial vehicle is not completed.

* * * * *